July 15, 1969  K. BUCHHOLZ ET AL  3,455,524
AIRCRAFT WITH STORABLE LIFTING JETS
Filed July 17, 1967  2 Sheets-Sheet 2

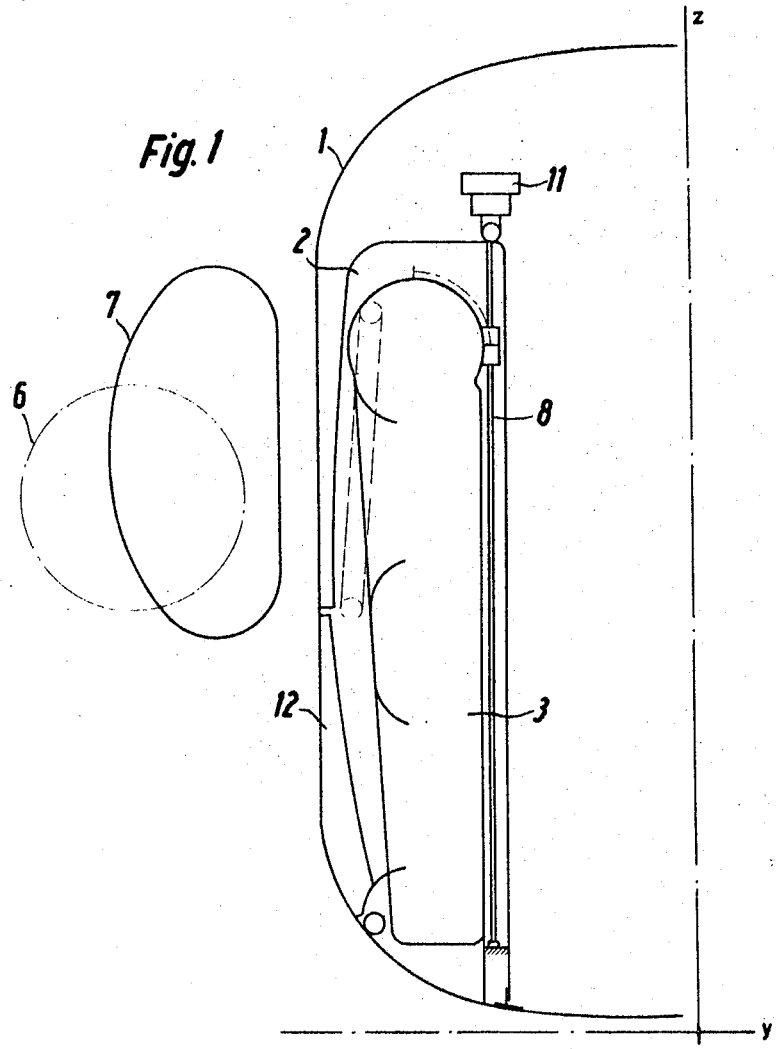
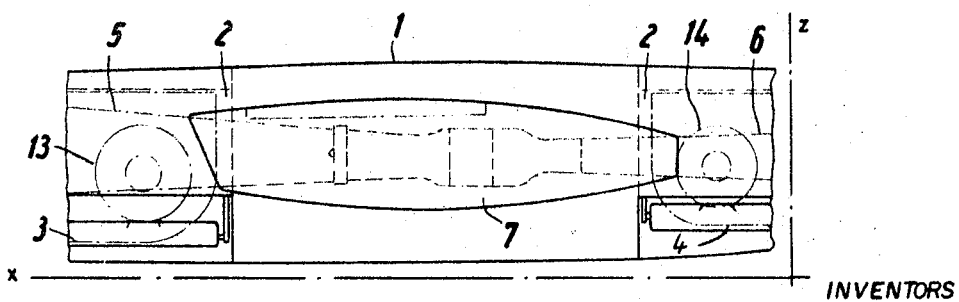

INVENTORS
Klaus Buchholz &
Werner Hoose

BY Otto John Munz
ATTORNEY

United States Patent Office 3,455,524
Patented July 15, 1969

3,455,524
AIRCRAFT WITH STORABLE LIFTING JETS
Klaus Buchholz, Hamburg, and Werner Hoose, Ahrensburg, Germany, assignors to Hamburger Flugzeugbau G.m.b.H., Hamburg-Finkenwerder, Germany
Filed July 17, 1967, Ser. No. 653,839
Claims priority, application Germany, July 19, 1966, H 59,984
Int. Cl. B64d 41/00; B64c 15/00, 29/00
U.S. Cl. 244—58                                            10 Claims

ABSTRACT OF THE DISCLOSURE

An aircraft with lifting jets stored in lateral pockets of its fuselage in a position approximately parallel to the vertical axis of the aircraft. The lifting jets are movable into an operating position around the intake and jet thrust zones of horizontal propulsion units. The lifting jets are preferably mounted in a platform which is mounted pivotably independently of the horizontal propulsion units by means of a lifting and lowering spindle connected to the inside of the platform and a linkage device hingedly connected to the lifting jets or the platform approximately at the center of their gravity and guided in a track of the fuselage, so that the lifting jets in operating position are positioned underneath the intake and jet thrust zone of the horizontal propulsion units. The lifting and lowering spindle is arranged in the pocket in parallel with the vertical axis of the aircraft. It is connected pivotably to the inner side of the lifting jet or the platform facing the fuselage.

FIELD OF THE INVENTION

The invention relates to aeronautical machines sustained by the reaction to the downward movement of restricted masses or jets of air or other fluid.

In particular, the invention relates to aircraft with lifting jets in lateral pockets of the fuselage in a position approximately parallel to the vertical z axis of the aircraft and being movable and pivotable into an operative position around the intake and jet thrust zone of horizontal propulsion units. The lifting jets are preferably mounted in a platform.

DESCRIPTION OF THE PRIOR ART

The prior art is represented by U.S. Patent No. 3,084,888 issued Apr. 9, 1963, to Heinrich Hertel for a "VTOL Aircraft." In the aircraft of the prior art, the lifting jets or the platform carrying same, are simply pivotable into and out of the fuselage. By "simply pivotable" is meant that all points in the jets move on concentric circles into and out of the fuselage. For example, in one case in the prior art, the lifting jets are mechanically mounted to horizontal propulsion units in such a manner, that they swing about the longitudinal central axis of the horizontal propulsion units into and out of the fuselage. This necessitates a mutual dependency of the position of the horizontal propulsion units and that of the lifting jets, so that the arrangement of the horizontal propulsion units and even the spatial subdivision of the aircraft become substantially dependent upon the pivoting system. Also affected are the pivoting range and direction. This condition has a restricting effect upon the total structure of the aircraft. If attempts are made to use the prior art, storable lifting systems in conventional propulsion unit arrangements, the geometrical relationship among propulsion units, lifting jets, and fuselage lead to aerodynamically unfavorable results. Because of the simple pivoting of the prior art, it is necessary in the conventional aircraft designs to provide specially located chambers for receiving the retracted lifting jets. These chambers undesirably change the fuselage geometry, as well as increase the air-flow surface in an undesired manner. Furthermore, the simple pivoting of the prior art requires a special locating of the horizontal propulsion units of conventional aircraft, in order that the lifting jets, when pivoting into their operative position or retracted into their storage chambers not move through the intake and/or jet thrust zone of the horizontal propulsion units. Covering the intake jet can lead to a damming effect in the intake manifold whereby the propulsion unit can be choked off and fail to start again. If the thrust jet is interfered with, the forward thrust of the aircraft is interrupted.

SUMMARY OF THE INVENTION

The invention eliminates the above deficiencies of the prior art by making the lifting jets movable into and out of storage in lateral pockets of the fuselage, independently of the horizontal propulsion units, by means of a raising and lowering drive means and a linkage device hingedly connected at approximately the center of gravity of the lifting jets or their platform and guided in a track mounted to the fuselage. The lifting jets move underneath the intake and jet thrust zone of the horizontal propulsion units. In this manner, an optimum and mutually independent arrangement of the horizontal propulsion units and the lifting jets is accomplished while maintaining a minimum airflow surface at the fuselage of the aircraft.

One favorable embodiment of the invention provides that the raising and lowering drive means moves the fuselage-directed side of the lifting jet in parallel with the vertical axis of the aircraft. The fuselage-directed side of the lifting jet or its platform is that side facing the fuselage, when the lifting jet is in its horizontal lifting position. This movement affords the advantage that the drive means for the lifting jet or the platform is provided, in a space saving manner, in the interior of the pocket.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWING

FIGURE 1 shows a vertical cross section through an airplane fuselage with the jet lift platform in its stored position.

FIGURE 3 is a view toward the left side of FIGURE 2.

DESCRIPTION OF THE PREFERRED EMBODIMENTS

Figure 4:
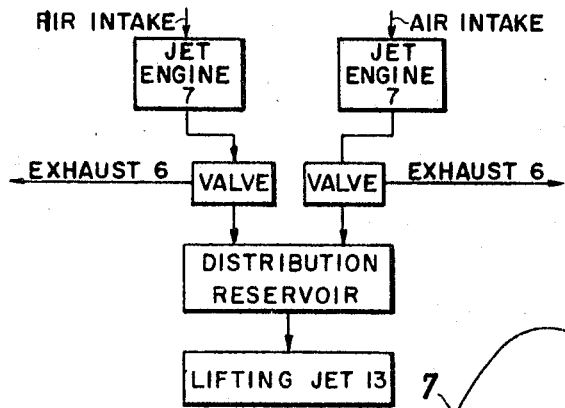
FIGURE 4 is a gas flow diagram for the invention.
Figure 2:
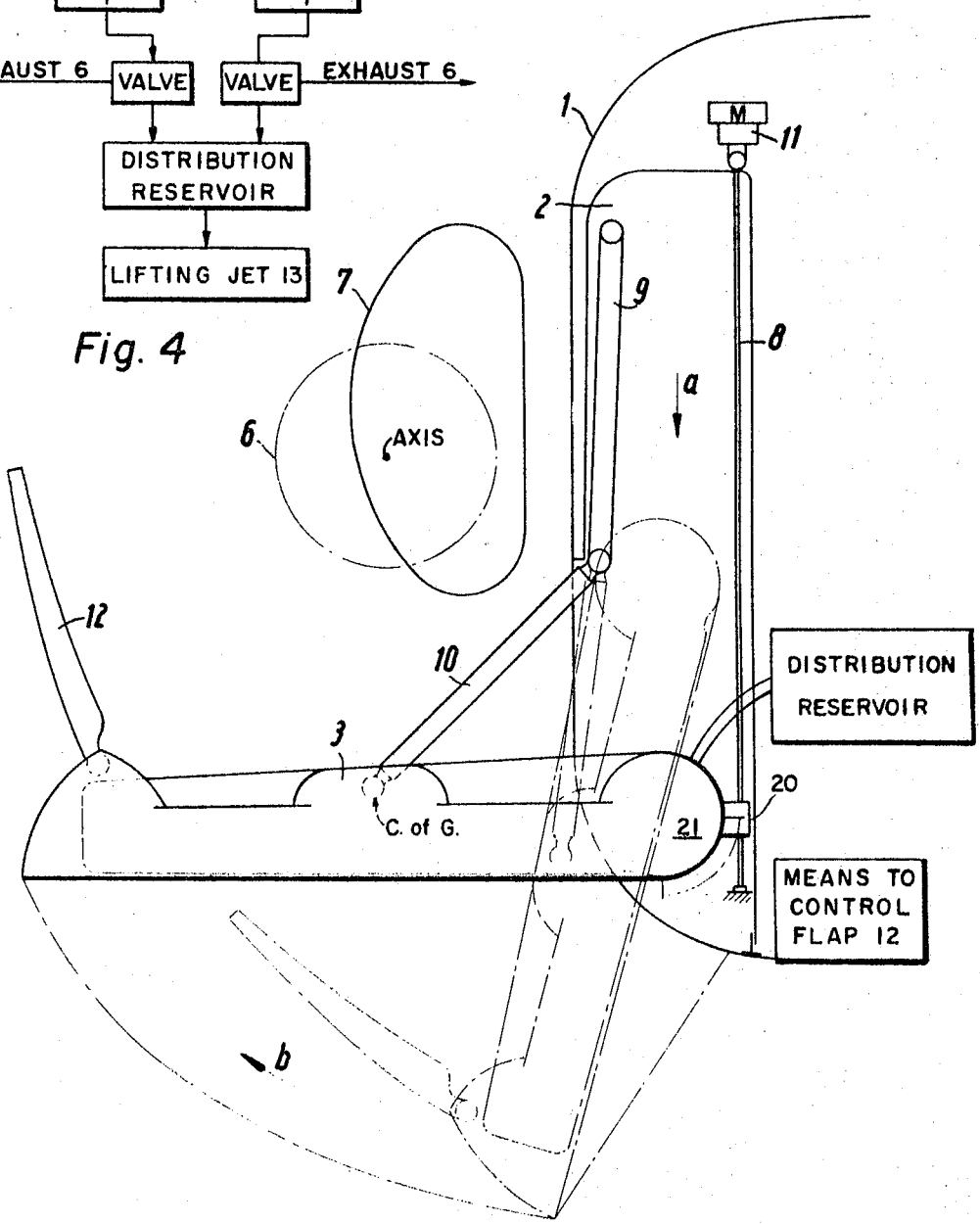
FIGURE 2 shows the same vertical cross section of FIGURE 1, with the platform pivoted outwardly into its horizontal lifting position.

A fuselage 1 of an aircraft is provided with lateral pockets 2. These pockets receive platforms 3 and 4, wherein lifting jets 13 and 14 are mounted. A structural example of a lifting jet usable in the present invention is shown in FIGURE 4 of U.S. Patent No. 3,273,339 issued on Sept. 20, 1966, to R. Borysthen-Tkacz for a "Propulsion System for High Speed VTOL Aircraft." The platforms and thus the lifting jets provided therein rest, in the retracted stored position of FIGURE 1 in the pockets 2 in a position approximately parallel to the plane of the vertical axis $z$ and the horizontal axis $x$ of the aircraft and are moved into their operative horizontal lifting position in the horizontal $xy$ plane. In moving between the vertical storage position in the $xy$ plane and the horizontal lifting position, the lifting jets or their platforms never pass through the intake zone 5 or the jet thrust zone 6 of the horizontal propulsion unit 7. Including the unit 7 itself and its zones 5 and 6 under the term "zone of operation," it is seen that the lifting jets and their platforms never move through the zone of operation. As shown in FIGURES 1 and 2, the platforms 4 and 3 carrying the lifting jets are movable, independently of the horizontal propulsion unit 7, by means of a raising and lowering, threaded spindle 8 and a linkage means 10 hingedly connected at approximately the center of gravity of the platforms and guided in a track 9 of the fuselage 1. Nut 20 is mounted to the platform 3 of FIGURES 1 and 2 and is swingable through about 90 degrees of arc. The particular structural essentials shown move the jets underneath the intake zone 5 and underneath the jet thrust zone 6 of the horizontal propulsion unit 7. The raising and lowering spindle 8 is provided in the pocket 2 in parallel to the vertical $z$ axis of the aircraft and engages the fuselage-directed side of the platform 3 or 4, respectively. The lowering spindle is driven by means of a motor 11.

During the outward moving procedure, the platform 3 of FIGURE 2 at first moves in the direction of arrow $a$ into the intermediate position indicated by dot-dash lines. While the jet is near its storage position in the lateral pocket 2, the upper end of linkage 10 slides in track 9. When the linkage device 10 has reached the lower position in track 9, the lifting jet is near its horizontal lifting position and the upper end of 10 pivots in the bottom of 9 and the platform is swung, by the raising and lowering spindle 8, in the direction of arrow $b$ into its horizontal operating position. During the movement of the platform, a cover flap 12 is erected. In the stored position of the platform as shown in FIGURE 1, the cover flap 12 forms part of the outer skin of the fuselage. The retracting of the platform from the horizontal lifting position into the vertical storage position takes place in reverse order. A means to control cover flap 12 is shown attached to the aircraft in FIGURE 2 as a labeled box, to rotate the flap 12 outwards for the horizontal lifting position. In a modification of the illustrated embodiment, the lifting jets can be connected directly with the lifting and lowering spindle 8, as well as with the linkage means 10, at platform thus being eliminated, and can be pivoted inwardly and outwardly in the above described manner.

FIGURE 4 shows a gas flow diagram for the invention. Air is taken into two horizontal propulsion units 7 which are jet engines. The exhaust generated by these engines flows through a valve which directs it either into the horizontal direction as exhaust 6 or into a common distributing reservoir. From the reservoir, the hot gases are fed to the various lifting jets 13.

While in the drawings two pockets on each side of the fuselage are demonstrated, there may be a different amount of the pockets symmetrically distributed on the circumference of the fuselage, and the pockets do not necessarily need to be on the wing sides of the fuselage as shown, but may be at the front and/or rear sides as well or instead. Furthermore, the symmetrical distribution is desired to balance the movements of the lifting jets, but the lifting jet thrusts and the aerodynamic structure can be varied to obtain unsymmetric distributions and locations.

While the drive means 8, 11 and 20 were shown in the drawings as a threaded spindle, other equivalent means capable of accomplishing the purpose of raising and lowering, such as hydraulic means and spring means are to be included.

The drawings show a scale model of one preferred embodiment of the invention.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

We claim:
1. An aircraft, comprising:
 (a) a fuselage having at least one side pocket;
 (b) a lifting jet means mounted to said fuselage and having a fuselage-facing side;
 (c) a horizontal propulsion means for supplying propulsion forwards;
 (d) and a means to move said lifting jet means between a horizontal lifting position and a vertical storage position, said vertical storage position being in said pocket; said means to move being structurally independent of said horizontal propulsion means; said means to move including means to maintain said lifting jet means continually outside of the zone of operation of said horizontal propulsion means; said means to move comprising a drive means (8, 11 and 20) mounted to said fuselage to raise and lower the fuselage-facing side (21) of said lifting jet means, a linkage means (10) pivotally connected at one end to said lifting jet means away from said fuselage-facing side, and a track means (9) mounted to said fuselage to provide a constraint for the sliding movement of the other end of said linkage means when said lifting jet means is near its storage position and to provide a fixed pivot for said other end of the linkage means when said lifting jet means is near to its horizontal lifting position.

2. An aircraft as claimed in claim 1, said drive means being located within the fuselage and capable of moving the side (21) parallel to the vertical axis of the aircraft.

3. An aircraft as claimed in claim 1, said linkage means being connected to the center of gravity of said lifting jet means at said one end.

4. An aircraft as claimed in claim 1, said lifting means comprising a platform and at least one lifting jet, said lifting jet being mounted in said platform.

5. An aircraft as claimed in claim 1, said drive means comprising a threaded spindle, a nut engaged thereon, and a means to rotate said spindle about its longitudinal axis; said nut being pivotally mounted to fuselage-facing side of said lifting jet means.

6. An aircraft as claimed in claim 1, said drive means being a hydraulic means.

7. An aircraft as claimed in claim 1, there being a plurality of side pockets, said lifting jet means being separated into a number of units, equal to the number of side pockets, there being one unit associated with each pocket, there being a means to move associated with each pocket.

8. An aircraft as claimed in claim 1, there being a symmetrical distribution of said pockets about said fuselage.

9. An aircraft as claimed in claim 1, said pockets being symmetrically distributed on the sides of the fuselage parallel to the longitudinal axis of the fuselage.

10. An aircraft as claimed in claim 1, further comprising a cover flap means (12) to close said fuselage pocket when said jet lifting means is in its storage position and means to control the relative position of said flap means to said lifting jet means.

References Cited
UNITED STATES PATENTS

| | | | |
|---|---|---|---|
| 3,084,888 | 4/1963 | Hertel | 244—23 |
| 3,215,369 | 11/1965 | Johnson | 244—15 |
| 3,388,878 | 6/1968 | Peterson et al. | 244—23 |

MILTON BUCHLER, Primary Examiner

JAMES E. PITTENGER, Assistant Examiner

U.S. Cl. X.R.

244—12